(12) United States Patent
Jackson et al.

(10) Patent No.: US 7,745,029 B2
(45) Date of Patent: Jun. 29, 2010

(54) FERRITIC STEELS FOR SOLID OXIDE FUEL CELLS AND OTHER HIGH TEMPERATURE APPLICATIONS

(75) Inventors: Melvin Jackson, Corea, ME (US);
Canan Uslu Hardwicke, Simpsonville, SC (US); Hari Nadathur Seshadri, Bangalore (IN); Amitabh Verma, Greater Noida (IN); Sheela Ramasesha, Karnataka (IN); Aravind Dattatrayarao Chinchure, Bangalore (IN); Kaushik Vaidya, Karnataka (IN)

(73) Assignee: General Electric Company, Niskayuna, NY (US)

( * ) Notice: Subject to any disclaimer, the term of this patent is extended or adjusted under 35 U.S.C. 154(b) by 699 days.

(21) Appl. No.: 11/593,927

(22) Filed: Nov. 7, 2006

(65) Prior Publication Data

US 2008/0107947 A1    May 8, 2008

(51) Int. Cl.
*H01M 8/12*      (2006.01)
*C22C 38/22*     (2006.01)

(52) U.S. Cl. .............................. 429/32; 429/38; 420/40; 420/67

(58) Field of Classification Search ................ 420/40, 420/67, 83; 429/32, 38
See application file for complete search history.

(56) References Cited

U.S. PATENT DOCUMENTS

| | | | | |
|---|---|---|---|---|
| 5,110,544 A * | 5/1992 | Sato et al. | ................. | 420/40 X |
| 5,800,152 A | 9/1998 | Taimatu et al. | ................ | 420/40 |
| 6,776,956 B2 | 8/2004 | Uehara et al. | ................. | 420/40 |
| 6,936,217 B2 * | 8/2005 | Quadadakkers et al. | ....... | 420/40 |
| 2001/0002296 A1 * | 5/2001 | Nazmy et al. | ............. | 420/40 X |
| 2006/0286433 A1 * | 12/2006 | Rakowski et al. | ............. | 429/38 |
| 2007/0122304 A1 * | 5/2007 | Ramasesha et al. | ........... | 420/40 |

OTHER PUBLICATIONS

S.C. Kung et al. "Performance of Metallic Interconnect in Solid-Oxide Fuel Cells", presented Oct. 30-Nov. 2, 2000, pp. 1-3.
P.E. Gannon et al. "High-temperature oxidation resistance and surface electrical conductivity of stainless steels with filtered arc Cr-Al-N multilayer and/or superlattice coatings", Surface & Coatings Technology 188-189 (2004), pp. 55-61.
F.S. Pettit et al., "Science and Technology of Advanced Metallic Systems for Applications in Intermediate Temperature Solid Oxide Fuel Cells", National Energy Technology Laboratory, dated Sep. 22-23, 2005, 66 pages.

* cited by examiner

*Primary Examiner*—Stephen J. Kalafut
(74) *Attorney, Agent, or Firm*—Francis T. Coppa

(57) ABSTRACT

Oxidation-resistant ferritic steel alloys for high temperature applications consist essentially of chromium (Cr) in an amount from about 18 to about 25 atom percent, tungsten (W) in an amount from about 0.5 to about 2 atom percent, manganese (Mn) in an amount less than about 0.8 atom percent, aluminum (Al) in an amount less than about 0.2 atom percent, silicon (Si) in an amount less than about 0.1 atom percent, and rare earth metals that includes neodymium (Nd) in an amount from about 0.002 to about 0.2 atom percent with the balance being iron (Fe). Also disclosed herein are solid oxide fuel cells that include separators formed for the oxidation resistant ferritic alloys.

20 Claims, 1 Drawing Sheet

Figure
PRIOR ART
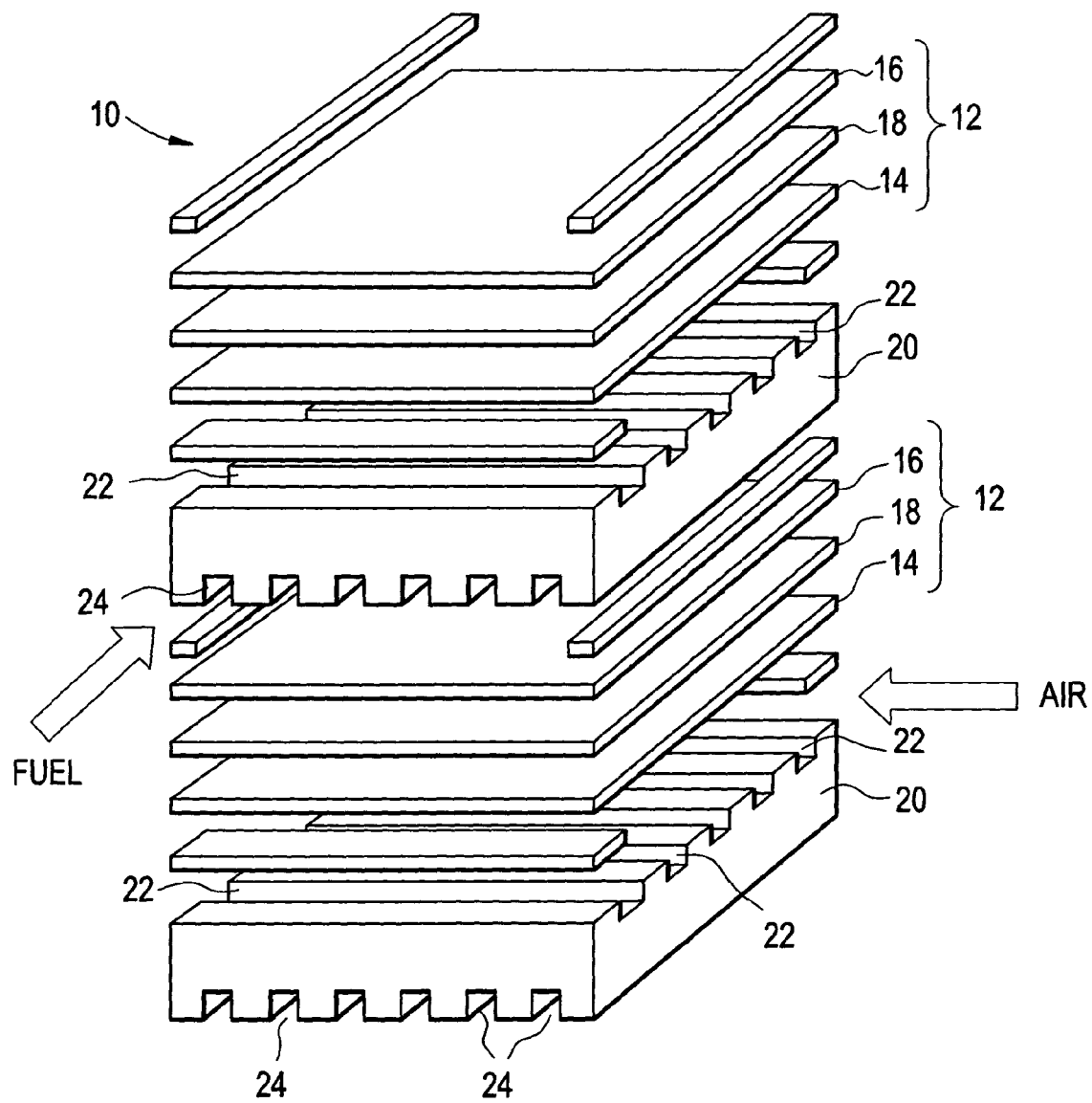

FERRITIC STEELS FOR SOLID OXIDE FUEL CELLS AND OTHER HIGH TEMPERATURE APPLICATIONS

BACKGROUND OF THE INVENTION

The disclosure relates to oxidation-resistant ferritic steel compositions that can be used as a separator for solid oxide fuel cells (SOFC) and for other applications where high temperature stability and oxidation resistance are required.

As seen in the prior art FIGURE, a typical planar solid oxide fuel cell stack 10 includes one or more cells 12 comprised an electrolyte plate 18 sandwiched between a fuel electrode (anode) 14 and an air electrode (cathode) 16. The electrolyte plate 18 is typically formed of the stabilized zirconia, e.g., yttrium stabilized zirconia. A separator 20 (also referred to as an interconnect) is typically used in a lamellar-like structure to separate multiple cells 12 in order to attain a usable power supply. $H_2$ and $CO_2$ are supplied as fuel sources to a passage space 22 formed between the separator 20 and the fuel electrode (anode) 14. Air is supplied to another passage space 24 formed between the separator 20 and the air electrode (cathode) 16. The electrolyte plate provides oxygen ion conductivity to facilitate the reaction between the hydrogen and the oxygen ions so as to generate electrons.

The solid oxide fuel cell is formed as a lamellar structure of plates in order to reduce the internal resistance and to increase the effective electrode area per unit volume. The coefficient of thermal expansion of the material employed for the separator 20 is preferred to be close to those of the air electrode 14, the fuel electrode 16 or the solid state electrolyte 18; better corrosion resistance and high conductivity are also required for the materials used in the separator 20. Typical separators are formed of electrically conductive ceramic materials such as (La, alkaline earth metal) $CrO_3$ based materials If the surface area of the electrolyte plate 18 is formed to be larger than those of the fuel electrode 14 or the air electrode 16, the lamellar forming can be easily achieved with the separator 20, resulting in easily holding the electrolyte plate 18 in place. However, since the separator 20 is often made of brittle ceramic materials such as the $LaCrO_3$ materials mentioned previously, there remain problems including insufficient strength, delamination, and poor formability.

Accordingly, the separator is clearly an important component of SOFCs. Its primary function is to serve as a support for the electrolyte, anode and cathode; separate cells, seal hydrogen gas ($H_2$) and air as fuel sources, and at the same time to permit the flow of electrical current. Because of this, the separator must be formed of a material that has electrical conductivity at high temperature, e.g., greater than 600° C.; be oxidation resistant within the SOFC operating environment, and have an equivalent coefficient of thermal expansion as the electrolyte (e.g., yttria stabilized zirconia). However, ceramic materials are relatively expensive as well as difficult to fabricate since they are inherently brittle materials, especially for the larger SOFCs currently being fabricated.

Recent efforts have been made to replace the ceramic materials with metal or steel based alloys. Metal or steel based alloy materials, therefore, require several important parameters be met for fuel cell components including, among others, a strong resistance against oxidation, desirable electro-conductivity, and thermal cycling stability when operated in oxidation and fuel areas within the high temperature environment. When such a metallic material is used at up to 1000, degrees Celsius, the metallic material oxidizes and an oxide film is formed on the surface. Ideally a metallic material used as a separator for a fuel cell would allow an oxide film to form with a desired thickness and then remain stable at that thickness arresting subsequent oxide formation and at the same time providing the desired electrical conductivity. Current ferritic based steel compositions typically show high growth rates and resistivities of surface oxides formed during high temperature exposure. In fact, the area specific resistivities (ASR) of these compositions are projected to be in excess of 150 milliohms-cm2 after 40,000 hours at 850° C. The oxide thickness after such as an exposure is expected to be in excess of 30 microns. Oxide thicknesses in excess of 30 microns are likely to delaminate during SOFC operation and crack during thermal cycling.

Accordingly, there continues to be a need for improved steel compositions that exhibit increased oxidation resistance, lower resistivity, have a coefficient of thermal expansion that closely matches that of the electrolyte as well as thermal cycling stability since the standard operating lifetime of the SOFC is typically rated for 40,000 hours or more.

SUMMARY OF THE INVENTION

Disclosed herein are oxidation resistant ferritic steel compositions that are suitable for use as separators for solid oxide fuel cells. In one embodiment, the oxidation-resistant ferritic steel alloys for high temperature applications consist essentially of chromium (Cr) in an amount from about 18 to about 25 atom percent, tungsten (W) in an amount from about 0.5 to about 2 atom percent, manganese (Mn) in an amount less than about 0.8 atom percent, aluminum (Al) in an amount less than about 0.2 atom percent, silicon (Si) in an amount less than about 0.1 atom percent, and rare earth metals that includes neodymium (Nd) in an amount from about 0.002 to about 0.2 atom percent with the balance being iron (Fe).

In another embodiment, the oxidation-resistant ferritic steel alloys for high temperature applications consisting essentially of chromium (Cr) in an amount from about 18 to about 25 atom percent, tungsten (W) in an amount from about 0.5 to about 2 atom percent, manganese (Mn) in an amount less than about 0.8 atom percent, aluminum (Al) in an amount less than about 0.2 atom percent, silicon (Si) in an amount less than about 0.1 atom percent, and rare earth metals that includes each one of Ce, La, and Nd in an amount from about 0.002 to about 0.2 atom percent with the balance being iron (Fe).

A solid oxide fuel cell comprises at least two fuel cells, each fuel cell comprising an electrolyte plate sandwiched between an anode and a cathode; and a separator disposed between the at least two fuel cells and configured to provide gas flow channels, the separator formed of a ferritic steel alloy consisting essentially of chromium (Cr) in an amount from about 18 to about 25 atom percent, tungsten (W) in an amount from about 0.5 to about 2 atom percent, manganese (Mn) in an amount less than about 0.8 atom percent, aluminum (Al) in an amount less than about 0.2 atom percent, silicon (Si) in an amount less than about 0.1 atom percent, and a rare earth metal that includes neodymium (Nd) in an amount from about 0.002 to about 0.2 atom percent with the balance being iron (Fe).

The disclosure may be understood more readily by reference to the following detailed description of the various features of the disclosure and the examples included therein.

BRIEF DESCRIPTION OF DRAWINGS

The FIGURE is a perspective view of a prior art solid oxide fuel cell.

DETAILED DESCRIPTION OF THE INVENTION

It has been discovered that certain chromium based ferritic steels that include neodymium (Nd) as an element are suitable for use as a separator in SOFCs and other high temperature applications. As stresses at interfaces between metals and their growing oxides are proportional to the oxide thickness, the Nd containing alloys have been found to be more resistant to oxide delamination and cracking since oxide growth is minimized. Such oxide damage normally increases the conduction path through the oxide layer, thereby deleteriously increasing ASR. Thus, by minimizing oxide growth, the ASR can be minimized. Both the oxide thickness and the ASR for Nd containing chromium based ferritic steels have been projected (based on kinetic modeling after initial testing) to be much superior to values for Nd-free alloys along with the benefit becoming more significant at longer high temperature exposure times, which is believed to be due to the reduction in $Cr^{3+}$ diffusivity in the $Cr_2O_3$ scale for a Nd containing alloy.

In one embodiment, the chromium based ferritic steel composition consists essentially of chromium (Cr) in an amount from about 18 to about 25 atom percent, tungsten (W) in an amount from about 0.5 to about 2 atom percent, manganese (Mn) in an amount less than about 0.8 atom percent, aluminum (Al) in an amount less than about 0.2 atom percent, silicon (Si) in an amount less than about 0.1 atom percent, and a rare earth metal that includes Nd in an amount from about 0.002 to about 0.2 atom percent with the balance being iron (Fe).

In another embodiment, the ferritic steel composition consists essentially of chromium (Cr) in an amount from about 18 to about 25 atom percent, tungsten (W) in an amount from about 0.5 to about 2 atom percent, manganese (Mn) in an amount less than about 0.8 atom percent, aluminum (Al) in an amount less than about 0.2 atom percent, silicon (Si) in an amount less than about 0.1 atom percent, and rare earth metals that includes each one of Ce, La, and Nd in an amount from about 0.002 to about 0.2 atom percent with the balance being iron (Fe). Other rare earth metals in smaller amounts can be added in addition to those noted above. The Nd can be provided in the form of a misch metal. A preferred misch metal is a mixture consisting of cerium (Ce) in an amount of about 50 atom percent and lanthanum (La) in an amount of about 25 atom percent and Nd in an amount of about 25 atom percent.

As will be discussed in greater detail herein, the ferritic steel compositions advantageously provide good oxidation resistance, resistance to delamination, and are resistant to cracking and subsequent exfoliation even in the case of long time exposure and use. Moreover, the ferritic steel compositions provide an equivalent coefficient of thermal expansion to that of the stabilized zirconia as well as sufficiently low oxidation resistance due to slow oxidation growth in high temperature environments over extended time periods (40,000 hours or more). Still further, the ferritic steel compositions can be easily and inexpensively fabricated with suitable properties for serving as a separator material used in a solid oxide fuel cell.

For the purposes of this specification, the term "atom percent" is defined as the concentration of a particular element based on the number of moles or atoms of a particular element relative to the total number of moles or atoms of all elements within an alloy.

Presently, zirconia stabilized with various stabilizing components such as MgO, $Y_2O_3$, CaO or the like have been used as the principal electrolyte materials for SOFCs. These materials are preferred because of their high strength, high toughness, high melting point, and heat insulation as well as their electrical properties. The coefficient of thermal expansion for these types of electrolyte materials at room temperature to about 750° C. is about $11 \times 10^{-6}/°$ C. The above noted chromium based ferritic steel compositions have an equivalent coefficient of thermal expansion close to that of stabilized zirconia. By use of the term "equivalent" it is meant that the ferritic steel compositions have a coefficient of thermal expansion of $10 \times 10^{-6}/°$ C. to $13 \times 10^{-6}/°$ C. over the same temperature range. By closely matching the coefficient of thermal expansion, it has been found that thermal cycling stability is improved. Moreover, a good resistance to exfoliation is observed.

As a material for the separator, as with the other fuel cell components, several important parameters already mentioned must be also be met including; strong resistances against both oxidation and reduction and better electro-conductivity because the separator connects the air electrode operated in the high temperature oxidation environment and the fuel electrode operated in the high temperature reduction atmosphere. Specifically, the above noted ferritic steels compositions show oxide growth of less than 5 microns and area-specific resistivities (ASR) of less than 60 milliohms-$cm^2$ at 850° C. after 1,500 hours.

EXAMPLES

In this example, four steel compositions were cast followed by sheet forming. Table 1 provides the chemical composition expressed in atom percent with the balance being Fe. The alloy compositions were exposed for 1500 hours in air at 850 C using a lanthanum strontium manganite paste for the cathode. Actual oxide thickness after this exposure is provided in Table 2. Also included is the theoretical oxide growth after 40,000 hours at 850° C. assuming parabolic growth, which represents the standard operating lifetime specification for SOFCs. ASR was also measured for the 1500 h/850 degree Celsius exposure of alloy D. The ASR measured after exposure at 850° C. for 1500 hours was 18 milliohms-$cm^2$ at 750° C.

TABLE 1

|   | Cr | W | Mn | Al | Si | La | Ce | Zr | Nd |
|---|----|----|------|------|------|------|------|------|------|
| A | 23 | 1.2 | 0-0.8 | 0-0.2 | <0.1 | 0.02 |   |   |   |
| B | 23 | 1.2 | 0-0.8 | 0-0.2 | <0.1 |   | 0.02 |   |   |
| C | 23 | 1.2 | 0-0.8 | 0-0.2 | <0.1 |   |   | 0.02 |   |
| D | 23 | 1.2 | 0-0.8 | 0-0.2 | <0.1 |   |   |   | 0.02 |

Because resistivity of similar oxides for ferritic steels decrease by ~40% as the measurement temperature is increased from 750 degrees Celsius to 850 degrees Celsius, the 850 Celsius ASR for Neodymium (Nd) containing alloy is projected to be ~11 milliohms/$cm^2$ instead of 18 milliohms/$cm^2$. Specifically, with the use of Neodymium (Nd), area-specific resistivities of 11 m$\Omega$/$cm^2$ were projected and assuming parabolic kinetics, this would provide an estimate of ~60 milliohms/$cm^2$ after 40,000 hours at 850 degrees Celsius. This compares very favorably and yields surprising results relative to an ASR in excess of 150 milliohms/$cm^2$ with oxide layer thicknesses greater than 30 microns, typical of most currently known ferritic stainless steels. Oxides with thicknesses at the level found for the composition of the Nd containing alloys therefore are much less likely to delaminate or crack during the repeated thermal cycling that fuel cell components undergo. The experimental results are summarized in Table 2 below.

TABLE 2

|  | A (La) | B (Ce) | C (Zr) | D (Nd) |
|---|---|---|---|---|
| Actual Oxide Growth (microns) | 7.7 | 12 | 7.0 | 2.2 |
| Theoretical Oxide Growth (microns) | >35 | >35 | >35 | 11-12 |

As discussed in the background section, at thicknesses greater than 30 microns, it can be expected that the stresses at interfaces between metals and their growing oxides are proportional to the oxide thickness. Since the predicted oxide thickness for samples A, B, and C is in excess of 30 microns, some fatigue will likely be observed manifesting itself in the form of delamination or exfoliation. In contrast, the sample D alloy that contains Nd had a predicted oxide thickness growth significantly less than 30 microns, and as such, can be expected to be much more resistant to oxide delamination and cracking.

Since stress induced oxide damage can effectively increase the conduction path through the oxide layer, the area specific resistivity (ASR) is expected to be relatively high for samples A-C. As noted above, the ASR measured after exposure at 850° C. for 1500 hours for alloy D was 18 milliohms-cm$^2$ at 750° C., which translates to a resistivity in the 80 to 90 ohm-cm range (18 milliohm-cm$^2$/2.2 microns). Since resistivity of similar oxides typically decreases by about 40 percent as the measurement temperature is increased from 750° C. to 850° C., the ASR at 850° C. is projected to be about 11 milliohms-cm$^2$, and assuming parabolic kinetics, this would provide an estimate of about 60 milliohms-cm$^2$ after 40,000 hours at 850° C. This compares very favorably and yields surprising results relative to ASRs in excess of 150 milliohms/cm$^2$ with oxide layer thicknesses greater than 30 microns, typical of most currently known ferritic stainless steels The ferritic steel compositions of this disclosure exhibited improved oxidation resistance when using the Nd alone or with other rare-earth element additions. Also, advantageously, and unexpectedly, the ferritic steel compositions exhibited low and stable area specific resistivity (ASR) due to low oxidation film growth over time at elevated temperatures, thus making the ferritic steels also suitable for intermediate temperature SOFC (600° C.) and other applications requiring low resistivity at more moderate temperatures.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. Oxidation-resistant ferritic steel alloys for high temperature applications consist essentially of chromium (Cr) in an amount from about 18 to about 25 atom percent, tungsten (W) in an amount from about 0.5 to about 2 atom percent, manganese (Mn) in an amount less than about 0.8 atom percent, aluminum (Al) in an amount less than about 0.2 atom percent, silicon (Si) in an amount less than about 0.1 atom percent, and rare earth metals that includes neodymium (Nd) in an amount from about 0.002 to about 0.2 atom percent with the balance being iron (Fe).

2. The oxidation-resistant ferritic steel alloys as in claim 1, wherein the alloys have an oxide layer of less than about 5 microns after exposure at 850° C. after 1,500 hours.

3. The oxidation-resistant ferritic steel alloy as in claim 1, wherein the steel alloys have a predicted oxide thickness of less than 30 microns after exposure at 850° C. for 40,000 hours.

4. The oxidation-resistant ferritic steel alloy as in claim 1, wherein the steel alloys have an area-specific resistivity of less than 18 milliohms-cm$^2$ at 750° C. after exposure at 850° C. for 1,500 hours.

5. The oxidation-resistant ferritic steel alloy as in claim 1, wherein the steel alloys have a predicted area-specific resistivity of less than 100 milliohms-cm$^2$ after exposure at 850° C. after 40,000 hours.

6. The oxidation-resistant ferritic steel alloy as in claim 1, wherein rare earth metals further include cerium and/or lanthanum each in an amount from about 0.002 to about 0.2 atom percent.

7. The oxidation-resistant ferritic steel alloy as in claim 1, wherein the steel alloy has a coefficient of thermal expansion from $10 \times 10^{-6}$/° C. to $13 \times 10^{-6}$/° C. over a temperature range of room temperature to 750° C.

8. Oxidation-resistant ferritic steel alloys for high temperature applications consisting essentially of chromium (Cr) in an amount from about 18 to about 25 atom percent, tungsten (W) in an amount from about 0.5 to about 2 atom percent, manganese (Mn) in an amount less than 0.8 atom percent, aluminum (Al) in an amount less than about 0.2 atom percent, silicon (Si) in an amount less than about 0.1 atom percent, and rare earth metals that includes each one of Ce, La, and Nd in an amount from about 0.002 to about 0.2 atom percent with the balance being iron (Fe).

9. The oxidation-resistant ferritic steel alloy as in claim 8, wherein the steel alloy has a coefficient of thermal expansion from $10 \times 10^{-6}$/° C. to $13 \times 10^{-6}$/° C. over a temperature range of room temperature to 750° C.

10. The oxidation-resistant ferritic steel alloys as in claim 8, wherein the alloys have an oxide layer of less than 5 microns after exposure at 850° C. after 1,500 hours.

11. The oxidation-resistant ferritic steel alloy as in claim 8, wherein the steel alloys have a predicted oxide thickness of less than 30 microns after exposure at 850° C. for 40,000 hours.

12. The oxidation-resistant ferritic steel alloy as in claim 8, wherein the steel alloys have an area-specific resistivity of less than 18 milliohms-cm$^2$ at 750° C. after exposure at 850° C. after 1,500 hours.

13. The oxidation-resistant ferritic steel alloy as in claim 8, wherein the steel alloys have a predicted area-specific resistivity of less than 100 milliohms-cm$^2$ after exposure at 850° C. after 40,000 hours.

14. A solid oxide fuel cell, comprising:
at least two fuel cells, each fuel cell comprising an electrolyte plate sandwiched between an anode and a cathode; and
a separator disposed between the at least two fuel cells and configured to provide gas flow channels, the separator formed of a ferritic steel alloy consisting essentially of chromium (Cr) in an amount from about 18 to about 25 atom percent, tungsten (W) in an amount from about 0.5 to about 2 atom percent, manganese (Mn) in an amount less than about 0.8 atom percent, aluminum (Al) in an amount less than about 0.2 atom percent, silicon (Si) in an amount less than about 0.1 atom percent, and a rare earth metal that includes neodymium (Nd) in an amount from about 0.002 to about 0.2 atom percent with the balance being iron (Fe).

15. The solid oxide fuel cell of claim 14, wherein the electrolyte plate is formed of yttria stabilized zirconia.

16. The solid oxide fuel cell of claim 14, wherein the steel alloy has an oxide layer of less than 5 microns after exposure at 850° C. after 1,500 hours.

17. The solid oxide fuel cell of claim 14, wherein the steel alloy has a predicted oxide thickness of less than 30 microns after exposure at 850° C. for 40,000 hours.

18. The solid oxide fuel cell of claim 14, wherein the steel alloy has an area-specific resistivity of less than 18 milliohms-$cm^2$ at 750° C. after exposure at 850° C. after 1,500 hours.

19. The solid oxide fuel cell of claim 14, wherein the steel alloy has a predicted area-specific resistivity of less than 100 milliohms-$cm^2$ after exposure at 850° C. after 40,000 hours.

20. The solid oxide fuel cell of claim 14, wherein the steel alloy has a coefficient of thermal expansion from $10 \times 10^{-6}$/° C. to $13 \times 10^{-6}$/° C. over a temperature range of room temperature to 750° C.

* * * * *

UNITED STATES PATENT AND TRADEMARK OFFICE
CERTIFICATE OF CORRECTION

| | |
|---|---|
| PATENT NO. | : 7,745,029 B2 |
| APPLICATION NO. | : 11/593927 |
| DATED | : June 29, 2010 |
| INVENTOR(S) | : Jackson et al. |

It is certified that error appears in the above-identified patent and that said Letters Patent is hereby corrected as shown below:

In Column 2, Line 8, delete "cm2" and insert -- $cm^2$ --, therefor.

In Column 4, Lines 31-32, delete "850 C" and insert -- 850° C --, therefor.

In Column 4, Line 53, delete "850 Celsius" and insert -- 850 degrees Celsius --, therefor.

Signed and Sealed this
Twenty-eighth Day of June, 2011

David J. Kappos
*Director of the United States Patent and Trademark Office*